Patented Feb. 10, 1942

2,272,563

UNITED STATES PATENT OFFICE 2,272,563

PROCESS FOR MANUFACTURING VEGETABLE PROTEINS

Hiromu Iwamae, Otake-cho, Saeki-gun, Japan

No Drawing. Application July 25, 1939, Serial No. 286,488. In Japan July 26, 1938

3 Claims. (Cl. 260—112)

The present invention relates to a process for manufacturing the vegetable proteins in maximum by evaporating and expelling the sulfur dioxide from the extracted liquid of the vegetable proteins obtained by making use of sulfurous acid, and has for its object to obtain the bleached proteins, least subject to denaturation, with a most excellent quality as the materials for protein fibres or plastic products, and also to carry the industry for utilizing proteins far more economically than ever before.

To attain such object this invention consists in the following steps. The proteins of the vegetable raw materials are extracted by 0.1N to N sulfurous acid, the extraction liquid being subsequently treated with an atomization or some other hitherto-known method, at normal or heated temperatures, and under normal or reduced pressures, to evaporate and expel the sulfur dioxide from it. Finally, the hydrogen ion concentration of the liquid is adjusted nearly to the isoelectric point of the proteins to be precipitated. It is one of the characteristic features of the present invention that no precipitants are used for the precipitation of the proteins in the extracted liquid, and the sulfur dioxide once evaporated, too, is possible to be collected and used again for the extraction of proteins. The process also enables one to collect with ease the useful substances, such as nitrogenous substances and saccharide, still dissolved in the supernatant liquid in which the proteins are precipitated, since the extracted liquid obtained by this process contains little of inorganic substances.

It goes without saying that in carrying a protein utilization industry, such as the manufacturing of protein fibres, plastic products, and the like, the work of separation and preparation of proteins from natural materials takes the most important part, theoretically, technically, and economically. And, it was fully explained in the application Serial Number 286,487 for a patent for manufacturing the vegetable proteins, which was simultaneously presented with this one, how the hitherto-known method, which makes use of a dilute alkali solution for the extraction of proteins from the proteinous materials, is incomplete, and how the new method, which makes use of sulfurous acid, is excellent for producing the proteins to be used for practical utilization.

To explain it in detail, the alkali solution, when employed for the extraction of the proteins from the vegetable raw materials, has a bad influence upon the proteins as it extracts them, causing their denaturation and decomposition: so that the proteins thus obtained present a weak and inferior nature as the materials for protein fibres, plastic products, and so forth. Above all, the vegetable proteins are so unstable against alkali that, when brought in contact even with a most dilute alkali solution, they are sure to be denatured and decomposed. And this accounts for the fact that the manufactured goods from proteins are considerably inferior in toughness and durability, since, due to the action of alkali, the amino-groups within the protein molecules, which act the most important chemical role, are apt to be decomposed and separated in making various goods from proteins.

If, however, an acid solution is applied for extracting the proteins from the proteinous raw materials, no such decomposition and separation result. It also accompanies a changeable nature by acid on the part of the proteins, activates the inactive amino-groups within the protein molecules, and increases the number of active amino-groups. It is for this fact that the various products that are made from the proteins thus obtained show a remarkable improvement in their nature and quality.

Up to the present, however, this process has been neglected on the ground that an acid solution lixiviated little yield of proteins. But the present inventor has found by a series of experiments that a solution of an adequate concentration of sulfurous acid brings about a good result for the lixiviation of the vegetable proteins. (Refer to the application for a patent presented simultaneously with the present one.) Moreover, the solution of sulfurous acid used for the extraction agent as in the case of the present invention, reduces and bleaches the proteins as it extracts them, and also keeps them out of oxidation, due to its reducing and bleaching action. In consequence, the manufactured goods from the proteins thus obtained show a remarkable improvement in toughness, durability, and the tone of the colour, as was already mentioned.

Furthermore, the present invention affords the following profits.

It requires no precipitants, such as alkali, or any of alkali salts, such as caustic soda, or ammonia, or sodium sulfite, or sodium carbonate, for the precipitation of the proteins from the extracted liquid. All that is to be done is the evaporation and expulsion of the sulfur dioxide from the extracted liquid, which is carried out with ease by taking advantage of the volatility of sulfur dioxide until at last the hydrogen ion concentration of the extracted liquid is easily adjusted nearly to the isoelectric point of the proteins to be precipitated (pH 4.0-5.0).

The sulfur dioxide evaporated and expelled in this process is able to be collected, and after being solved in water, used again for the extraction agent.

The neutralization process which is commonly applied to obtaining proteins, not only requires the precipitants but also makes it difficult to collect the chemicals used for the extraction and precipitation, which in consequence are abandoned beyond any hope of utilizing them for the second service.

The present invention requires nothing but sulfur dioxide for the extraction and precipitation of proteins, and that sulfur dioxide, which is the only chemical to be used for the whole process, is not abandoned, but collected easily, and used for the second service. This clearly shows that the present process is far more economical than any of the hitherto-known methods.

Moreover, as no extraction agents or precipitants are used for the process, the proteins thus obtained do not contain the impurities which those chemicals do not fail to bring forth. Considerable time, expenses, and labours, therefore, which are required for operations, such as washing, dialysis, and etc., for the removal of those impurities are saved, thus remarkably simplifying the manufacturing course of the proteins.

Since the extraction liquid is made to contain very little of inorganic substances, the process of the present invention makes it possible to collect easily the proteose, saccharide, and other substances dissolved in the supernatant portion of the liquid in which the proteins are precipitated.

One example for carrying the present invention into practice is explained below.

1 kg. of soy-bean cake is steeped in 0.1N to 0.6N sulfurous acid, its volume being 20 times as large as that of the cake employed, and kept stirring for 2-3 hours, thus completely dissolving the proteins. The extraction liquid is then filtered or placed quietly for some time, whereby settles to the bottom of the liquid the insoluble residue, which is subsequently removed. The pure and transparent liquid thus obtained is treated with an atomization process, or kept stirring under a reduced pressure to make sulfur dioxide evaporate from it, until at last the hydrogen ion concentration of the liquid is easily adjusted nearly to the isoelectric point of the proteins dissolved in it (pH4.0-5.0), whereby the proteins are precipitated in maximum.

The yield of the dried proteins is 20% of the original beancake.

I claim:

1. A process for the preparation of a protein material which consists of treating soybean meal with from .1 to 1.N aqueous sulfurous acid, separating the resulting solution from the insoluble residue, and expelling the sulfur dioxide from the solution, thereby precipitating the protein product.

2. A process for the preparation of a protein material which consists of treating soybean meal with from .1 to 1.N aqueous sulfurous acid, separating the resulting solution from the insoluble residue, and expelling the sulfur dioxide by atomization of the solution, thereby precipitating the protein product.

3. A process for the preparation of a protein material which consists of treating soybean meal with from .1 to 1.N aqueous sulfurous acid, separating the resulting solution from the insoluble residue, and expelling the sulfur dioxide by evaporation of the solution under reduced pressure, thereby precipitating the protein product.

HIROMU IWAMAE.